United States Patent
Mirzaaghaei et al.

(10) Patent No.: US 12,361,347 B1
(45) Date of Patent: Jul. 15, 2025

(54) AUTOMATIC ACTION ITEM DETECTION

(71) Applicant: Amazon Technologies, Inc., Seattle, WA (US)

(72) Inventors: Mehdi Mirzaaghaei, North Vancouver (CA); Bogdan Ciprian Pistol, West Vancouver (CA); Afshin Khashei, West Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 17/464,187

(22) Filed: Sep. 1, 2021

(51) Int. Cl.
| | |
|---|---|
| G06Q 30/00 | (2023.01) |
| G06N 5/04 | (2023.01) |
| G06Q 10/0631 | (2023.01) |
| G06Q 30/016 | (2023.01) |
| H04M 3/51 | (2006.01) |
| H04M 3/523 | (2006.01) |
| G10L 15/26 | (2006.01) |

(52) U.S. Cl.
CPC ........ *G06Q 10/06311* (2013.01); *G06N 5/04* (2013.01); *G06Q 30/016* (2013.01); *H04M 3/5133* (2013.01); *H04M 3/523* (2013.01); *G10L 15/26* (2013.01)

(58) Field of Classification Search
CPC .. G06Q 10/06311; G06Q 30/016; G06N 5/04; H04M 3/5133; H04M 3/523
See application file for complete search history.

(56) References Cited

U.S. PATENT DOCUMENTS

| | | | |
|---|---|---|---|
| 2015/0242410 A1* | 8/2015 | Pattabhiraman | G06Q 10/063116 707/728 |
| 2017/0098282 A1* | 4/2017 | Klemm | G06Q 50/01 |
| 2021/0280195 A1* | 9/2021 | Srinivasan | G06F 3/167 |
| 2022/0094544 A1* | 3/2022 | Sekar | G06Q 10/10 |
| 2022/0156462 A1* | 5/2022 | McNamara | G06Q 30/016 |
| 2022/0207392 A1* | 6/2022 | Hou | G10L 15/26 |
| 2023/0030202 A1* | 2/2023 | Swerdlow | H04M 3/5183 |

OTHER PUBLICATIONS

Devlin et al., "BERT: Pre-training of Deep Bidirectional Transformers for Language Understanding," Google AI Language, 2019, 16 pages.

* cited by examiner

*Primary Examiner* — Rasha S Al Aubaidi
(74) *Attorney, Agent, or Firm* — Davis Wright Tremaine LLP

(57) ABSTRACT

Systems and methods are described for automatic action item detection and generation. In some aspects, textual data, such as may be generated based on an interaction between at least two entities, may be received. At least one issue may be identified in the text using a first machine learning model. At least one action item, corresponding to the issue, may similarly be identified using a second machine learning model, with the action item including an action to be performed to resolve the at least one issue. The action item may be assigned to a queue of a plurality of queues based on attributes of the action item, with the queue corresponding to an action that is specified in the action item. In some aspects, a notification of the action item may also be provided, such as in real-time or near-real-time with the occurrence of the interaction between the two entities.

19 Claims, 9 Drawing Sheets

AUTOMATIC ACTION ITEM DETECTION

BACKGROUND

As many businesses expand, call centers, including partially or fully automated call centers, are becoming more wide spread to help handle an increase in communications with customers to resolve issues. Many tools, including cloud-based tools, have been developed to help manage this increase in communication with customers. In many cases, these tools automate a large part of directing a customer to the correct interface to address problems with invoices, returns, troubleshooting, etc., such as through automated multi-level menus or contact flows, that provide various decisions in which a customer or user can select to be directed to the correct resource to resolve one or more issues. In some cases, one or more of these contact flows may include being routed to a live conversation, e.g., text, voice, or video, with a representative of the service provider. It may be difficult and time consuming for these representatives to effectively take notes and create action items to be completed after the interaction, without either losing details of the action that needs to be taken, or occupying unnecessary time in taking notes after an interaction, thus preventing the operator from engaging in the next customer or user interaction.

BRIEF DESCRIPTION OF THE DRAWINGS

Various techniques will be described with reference to the drawings, in which.

DETAILED DESCRIPTION

Figure 1:
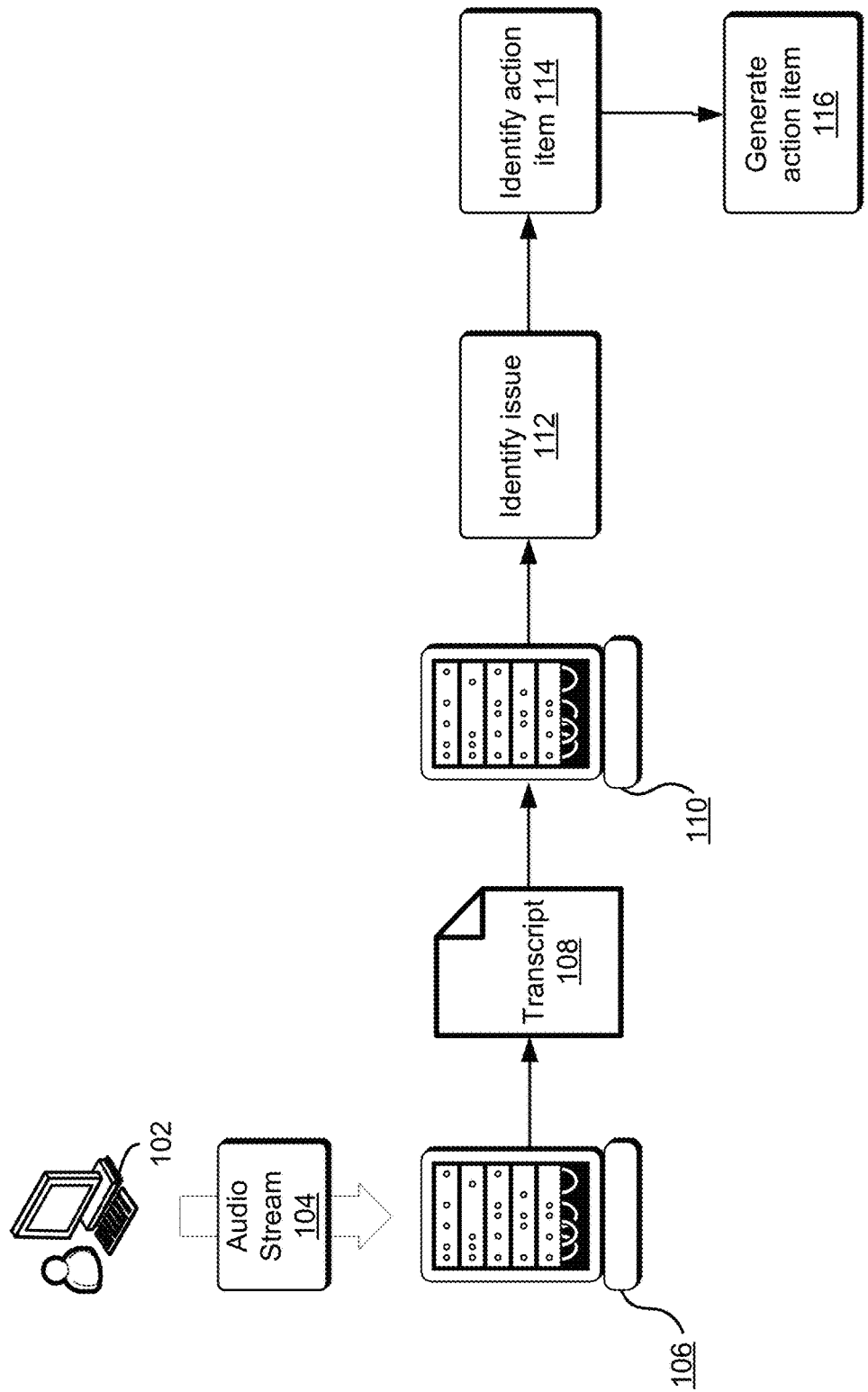
FIG. 1 illustrates an example process flow for generating an action item from a transcript of an audio stream, according to at least one embodiment.

Systems and methods are described herein relating to detecting issues and action items from textual data, and assigning the action item to a queue to process the action time. In some aspects, an audio stream, such as between two entities or users, may be received, such as through a computer-implemented service. In one example, the computerized service may be a partially or fully automated call service center, and the two users may be a customer and agent of the call center. The audio stream may be converted or transcribed to textual data. In some cases, the textual data may have indications (e.g., metadata) of what text corresponds to different speakers or users from the audio stream. A trained machine learning model may then be used to identify any issues in the textual data, such as via indication of certain words and phrases. An issue may correspond to any number of conditions or words or phrases, such as needing to return an item, obtain a refund, etc. In some cases, a trained Bidirectional Encoder Representations from Transformers (BERT) model or other natural language processing (NLP) model may be used to detect issues in the textual data.

Once an issue is identified, it may be tracked in the system, such that an outcome may be associated with and tracked for the issue, and one or more action items, or tasks or actions that need to be performed in order to resolve the issue, may be identified and tracked. In some cases, another BERT or NLP model may be used to identify one or more action items pertaining to a certain issue. In one example, an action item may be indicated by language or text indicating that a follow-up email will be sent, such as to confirm a refund or return of a product.

Once an action item is detected or determined, corresponding to an issue, a data structure or record may be created for the action item, and a notification of the action item generated and provided to a user, such as a call center agent. In some cases, this notification of the creation of an action item may be generated in real-time or near-real-time (concurrently) with the audio data being created in the first instance. The data structure may include the text that describes the action item to be taken from the transcript. In some examples, a title for the action item may be extracted from and/or generated from the transcript. The title may additionally or alternatively be generated using other contextual data or metadata accessed by the system, such as from one or more customer data stores or records. In some cases, some or all of this other data may similarly be provided in the action item data structure. In some aspects, the notification may provide for one or more options to edit the action item data structure, such as to add additional notations to the action item, correct one or more components of the action item, or for various other reasons. The notification may be provided through a dashboard of a graphical user interface, concurrently with the audio stream being generated, to enable a user to edit the action item concurrently with a live audio recording.

The action item, in some cases, may be assigned to a task queue or contact flow, to be directed to an appropriate workflow to resolve or satisfy the action item. In some cases, the notification of the action item may provide for one or more selectable options to change or manually assign the action item to a specific workflow or queue, to facilitate the action time being resolved or completed. In yet some aspects, the notification may provide for an accept or deny option, such that a user can accept the action item, which will prompt the system to associate the action item with the issue and assign it to a queue or workflow. If a user denies the action item, the action item may be closed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) reducing network bandwidth usage by providing more efficient resolution of issues and action items, thus negating the need for additional communications between users, and (2) other advantages as will be made apparent in the rest of this disclosure.

FIG. 1 illustrates an example process flow 100 for detecting and generating an action item record from a transcription of audio data. In some cases, one or more computing devices 102, such as operated by two different users, may communicate with each other to create an audio stream 104. The computing devices 102 may include any of a number of different computing devices with the capacity to communicate over one or more networks. In one example, a first computing device may be operated by an agent of a client of a service provider, and another computing device may be operated by a customer of the client. The audio stream 104 may take a variety of forms, and in some cases, may include metadata concerning attributes of the audio stream 104, such as what portion of the audio stream is associated with a given computing device or user. The audio stream 104 may be received by a transcription service or process 106, which transcribes the audio stream 104 and outputs a transcript 108 of the audio data. In some aspects, the transcription service 108 may perform the transcription in real time or near real time, or concurrently with, receiving the audio stream 104. In some cases, the audio stream 104 may be an actual stream of data, communicated in real time. In other cases, the audio stream 104 may comprise an audio file that has already been recorded prior to the transcription service 106 receiving it.

A second service 110, an issue and action item detection service or process (or detection service), may obtain the transcript 108 and analyze the transcript 108 to identify any issues and corresponding action items that need to be taken to resolve the issues. An issue may relate to some type of situation or occurrence that should or needs to be addressed. Example issues may include, in the customer call service example, returning an item, exchanging an item, getting a refund, etc. The detection service 110 may process the transcript 108 to identify words or phrases using one or more machine learning models that correspond to one or more issues, at operation 112. The output of this process may include a data structure that identifies the issue, includes relevant text corresponding to or describing the issue, and/or may include any relevant metadata that informs the issue. In some cases, an issue may also be associated with an outcome field, which may describe the resolution of the issue from the audio stream 104, and one or more action items, which may be actions to be taken in the future to further resolve the issue.

Once an issue is identified, the transcript 108 may further be searched or processed to identify any follow up actions or task (e.g., action items) at operation 114 that need or should be taken to resolve the issue and/or satisfy the underlying cause of the issue. In some cases, one or more machine learning models may be used to identify one or more action times pertaining to an identified issue. In an illustrative example, the phrase "I will . . . " from an agent or user representing the service provider may be a clear example of a trigger or text that satisfies the conditions for flagging an action item, as this phrase indicates that the agent is to perform some action, likely after the audio stream 104 has ended. In some embodiments, the action items may be identified, at operation 114, through an automatic correlation with any identified issues (e.g., via an issue-action mapping table or the like), such as issues identified at operation 112. Such a correlation could be defined by the client of the service provider and could be beneficial where the client already has specific actions that need to be taken for specific issues.

Once an action item has been identified, at operation 114, an action item record or notification may then be generated, at operation 116. In some examples, the action item may include an appropriate title, such as may be taken or derived from the transcript itself or metadata, text identifying the action item, surrounding text for context, and/or metadata of the audio stream itself or metadata concerning other customer data relating to one or more identifiers associated with the audio stream (e.g., customer name, invoice number, product identifier, etc.). In some cases, the issue and/or the action item, or a representation thereof, may be provided in a user interface, such as a graphical user interface (GUI), as part of a call center or other service dashboard, as may be utilized by agents to manage interactions with customers or users.

In some aspects issues and action items may be handled separately, such that an action item 114 may not directly correspond to or be associated with an issue 112. In these examples, an issue and an action item may be identified in parallel, such that operations 112 and 114 are performed in parallel. In other cases, such as illustrated, when the action item relates to an issue, the two operations 112, 114 may be performed serially. In yet other cases, issue identification 112 and action item identification 114 may be performed serially and in parallel, such that some action items may not be linked to an issue, while others are. The serial example is primarily described below; however, it should be appreciated that in the techniques described below, action items may not be directly related or associated with an issue, and the performance of identifying issues and actions can occur in serially, in parallel, or a combination of the two.

Figure 2:
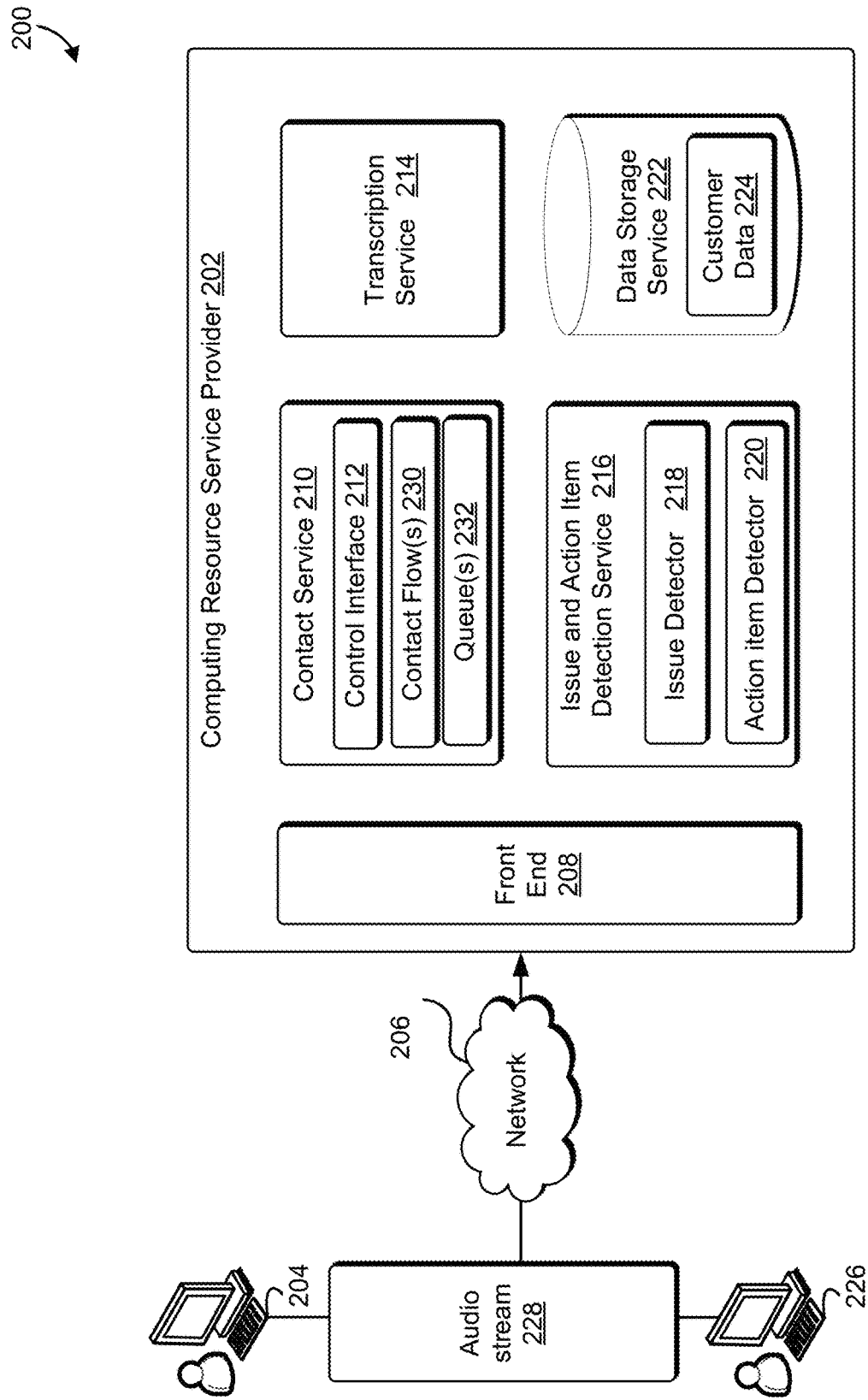
FIG. 2 illustrates an example environment in which the described techniques can be practiced, according to at least one embodiment.

FIG. 2 illustrates an example environment 200 in which an issue and action item detection service 216 (detection service 216) may be provided by a computing resource service provider 202. The detection service 216 may interact with various other computer-implemented services, such as one or more of a front end 208, a contact service 210, a transcription service 214 and/or a data storage service 222 to provide for action item detection, notification, and workflow allocation functionality, as will be described in greater detail below. Various client computing devices 204, 226 may interact with each other and/or the computing resource service provider 202 through one or more networks 206 to access the this functionality.

Clients 204, 226 may refer to a client computer system or computing device connected to a server (e.g., computing resource service provider) over a network 206. In some cases, client 204, 226 refers to a user or operator of a client computer system, and may be an employee of an organization that utilizes a computing resource service provider 202 to interact with various forms of data, such as through one or more of a detection service 216, front end 208, contact service 210, transcription service 214 and/or data storage service 222.

In some aspects two or more client devices 204, 226 may communicate with each other, such as via one or more audio, text, or video-based communication channels, such as using voice over internet protocol, cellular, audio and/or video interfaces to generate an audio stream 228 of interactions between the computing devices 204, 226. In some cases the audio stream may be generated and/or received by the computing resource service provider 202 in real time. In other cases, the audio stream 228 may be recorded audio data that may have been recorded at a previous time. In some cases, one of computing devices 204, 226 may be associated with the computing resource service provider 202, such as may be provided by or through a contact service or other computerized service 210. In these cases, the computing device may be operated by a human operator or user, such as may be referred to generally as an agent. In other aspects, the agent may be fully automated, including textual and audio communications (e.g., a bot).

In some cases, the front end 208 may receive the audio stream 228 and direct it to the appropriate service. The front end 208 may be a system including a set of web servers (e.g., a single web server or a set of web servers which may be managed by a load balancer) provided by the computing resource service provider 202. Web servers of the front end 208 may be configured to receive various requests and data and to process them according to one or more policies associated with the service. In some examples, client 204, 226 uses client software that is configured to establish a client-server relationship with a service of a computing resource service provider 202. A client 204, 226 may connect to a service via front end 208, which receives requests from clients and routes them to backend services. Front end 208 may interface with one or more of a detection service 216, a contact service 210, a transcription service 214 and/or a data storage service 222, and/or other services offered by a computing resource service provider 202 to its customers. In at least one embodiment, client 204, 226 interacts with a GUI to interact with various data provided by or through the computing resource service provider 202, and client-side software translates the GUI setup to a web service API request which is transmitted from the client computer system 204, 226 to front end 208 via a network 206. In an embodiment, the network 206 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 206 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. A computing resource service provider 202 described herein may be implemented using techniques described below in reference to FIG. 9. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 202 may provide data storage through a data storage service 222 to store and manage large volumes of data, including text, image, and other data. The data storage service 222 may store various data, such as may be organized into customer or account data 224. Customer data 224 may include one or more versions of various customer data, such as may pertain to an account, order, or other logical construct associated with a user of the computing resource service provider 202.

Data storage service 222 may be an on-demand data storage service, such as an object-based data storage service that services API requests to store and retrieve data objects synchronously, and may be configured to store various forms of data and media, including audio stream 228, transcriptions generated by a transcription service 214, and other data structures generated and updated by the detection service 216. The data storage service 222 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 222, may be organized into data objects, in one or more logical data containers. The data storage service 222 may include one or more data objects, which may have arbitrary sizes and may, in some instances, have constraints on size. Thus, the data storage service 222 may store numerous data objects of varying sizes. The data storage service 222 may operate as a key value store that associates data objects with identifiers of the data objects which may be used by the detection service 216, the contact service 210, and/or the transcription service 214 to retrieve or perform other operations in connection with the data objects stored by the data storage service 222. Access to the object-based data storage service 222 may be through application programming interface (API) calls to the service or via an interface, such as a graphical user interface (GUI). Access to the data storage service 222 may be through application programming interface (API) calls to the service, for example from client device 204, 226 directly or through the computing resource service provider 202 and/or front end 208.

It should be appreciated that the data storage service 222 may additionally or alternatively provide non-object based data storage, such as block data storage, table-oriented data storage, relational databases, file-based storage, and the like. The data storage service 222 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

The computing resource service provider 202 may also provide a contact service 210. The contact service 210 may be a collection of computing resources, including physical resources, virtual resources, or combinations thereof, configured to obtain, direct, and otherwise manage various communications streams from or between various computing devices, such as audio stream 228 between computing devices 204, 226. In some examples, the contact service 210 may provide automated or partially automated communications to computing devices, such as text or audio communications, to one or more computing devices 204, 226. In some cases, contact service 210 may facilitate establishing and managing communication channels between various computing devices 204, 226. In some cases, the contact service 210 may provide omnichannel communications. For example, text messaging or chat, voice contact, and/or video contact may be dynamically offered, based on such factors as customer preference and estimated wait times. The contact service 210, in some aspects, can integrate with one or more other services, to provide managed communication channels to users of the one or more services.

The contact service 210 may provide for a wide range of communication services to a variety of computing devices. In some examples, the contact service 210 may operate as a call center, such as for one or more web-based businesses, retailers, etc. In other cases, the contact service 210 may provide communication services to any number of different organizations, such as health related organizations, retail, construction, legal services, etc. It should be appreciated that the techniques described herein have a broad range of applications, and that the above-mentioned use cases are only given by way of example.

In some aspects, the contact service 210 may include one or more control interfaces 212. The control interface may provide a GUI to a computing device or agent associated with the contact service 210, to aid in establishing and managing communication channels with client computing devices. In some cases, the control interface 212 may provide a dashboard to facilitate managing various communication channels, various contact flows 230, and/or various queues 232. A contact flow 230 may encompass one or more menu options and routing directions (e.g., automated routing instructions) to respond to a customer inquiry, such as may be received from a computing device 204, 226, in the form of a text or audio stream, such as audio stream 228. A contact flow 230 may be contained in a data structure, which is processed when a communication channel is established, and may include different routing instructions, pointers to different audio recordings, text responses, and the like. In some cases, a contact flow 230 may include one or more automated responses, recorded menu offerings, etc., as will be appreciated by those having skill in the art. The contact service 212 may provide any number of different contact flows 230 to handle various customer inquiries.

The contact service 210 may also provide a number of different queues 232, to which issues and/or action items may be assigned. A queue 232 may be a storage location where an item or data structure is placed, typically temporarily, to be processed at a later time. The various queues 232 may be linked or associated with one or more contact flows 230, such that an action item may be placed in an appropriate queue 232 based on the action that needs to be taken to resolve or close the action. In some cases, the action to be taken may also correspond to a contact flow 230.

In some aspects, the computing resource service provider 202 may similarly provide a transcription service 214. The a transcription service 214 may be a collection of computing resources, including physical resources, virtual resources, or combinations thereof, configured to generate textual data from audio and/or video data, such as may be received as an audio stream 228. In some cases, transcription service 214 may obtain and/or generate metadata including an identifier of a speaker or "owner" of a portion of a communication received by the transcription service 214. In some cases, the metadata may be included with the audio data. In some examples, the audio data may comprise two or more channels, each associated with a different computing device 206, 224. In this example, each channel be correlated to a different speaker or computing device. In yet other cases, other information may be used to determine which portion of the communication data belongs to a respective computing device, such as pauses, punctuation, and other characteristics of language that may be used to infer such information. In any of these examples, the transcription service 214 may receive an audio stream or video stream, or collection of audio or video data (e.g., not in real time), and may convert the data to textual data, and output a document or other data object containing the textual data. This output may be referred to generally as a transcript, and may, in some cases, include source or speaker information and/or other metadata.

The computing resource service provider 202 may also provide an issue and action item detection service 216 (detection service). The detection service 216 may be a collection of computing resources, including physical resources, virtual resources, or combinations thereof, configured to detect issues and action items in textual data, such as one or more transcripts that may be received from the transcription service 214. In other cases, the detection service 216 may receive any collection of textual data to process, which may not necessarily originate from an audio stream or be transformed or converted form audio or video data. In some cases, the detection service may interact with the front end 208, contact service 210, transcription service 214 and/or data storage service 222 to provide action item detection functionality, as described in greater detail below.

In some aspects, the detection service 216 may include an issue detector 218. The issue detector 218 may include one or more computing resources configured to detect conditions that satisfy a criteria for an issue within data, such as textual data or a transcript of an audio stream 228. The issue detector 218 may include one or more trained models, such as machine learning models, trained to detect various types of issues in textual data. In a specific example, the issue detector 218 may include one or more BERT models or other NLP models that are training on textual data. An issue may refer to any type of situation that would benefit from some type of action or resolution. In the business example, and issue could relate or indicate a product return, exchange, refund, or similar such occurrences. In other examples an issue can be relate to any number of different scenarios, as indicated in textual data. A more detailed example of an issue detector 218 will be described below in reference to FIGS. 3 and 5 below.

Similarly, the detection service 218 may also include an action item detector 220. The action item detector 220 may include one or more computing resources configured to detect conditions that satisfy a criteria for an action item within data, such as textual data or a transcript of an audio stream 228. In some aspects, the action item detector 220 may identify the smallest set of contiguous words in textual data that indicate that an action needs to or is promised to be taken in relation to an identified issue. The action item detector 220 may include one or more trained models, such as one or more BERT models or other NLP models that are training on textual data. The action item detector 220 may be trained to identify words and phrases that indicate that an action will be or should be taken in the future to resolve one or more issues indicated in the textual data. A more detailed example of an action item detector 220 will be described below in reference to FIGS. 3 and 5 below. In some cases, metadata or contextual data may be extracted from the textual data or one or more client records or customer data 226 relating to the textual data to generate and/or include in the action item itself. In some cases, the action items may be identified, by action item detector 220, through an automatic correlation with one or more issues identified by the issue detector 118. In some cases, one or more issue mapping tables, or other similar data structures, may be used to specify the relationship between certain issues and corresponding action items to be logged/actions to be taken to resolve the identified issues. In some cases, these correlations may be defined by the client of the service provider. In some circumstances, these correlation tables may be particularly beneficial, such as where the client already has specific actions that need to be taken for specific issues.

In some aspect, additionally or alternatively to using a machine learning approach to identifying action items, a rule-approach may be implemented by the action item detector 220. In these implementations, that action item detector may be configured with a number of rules to identify when an action item is indicated in textual data. For example, when one or more rules may dictate that an action item is indicated when an agent states "I will [take X action]." Similarly, any number of rules relating the occurrence of words, statements, or words or statements made in succession, ma indicate an action item. In some cases, the rules may be adapted, such as using one or more machine learning techniques. In yet some cases, at least some of the rules may be manually entered or configured, such as by an agent, etc. In yet some cases, a universal set of rules may be observed and input or obtained by the action item detector 220.

In some cases, upon detecting an issue, an issue record may be created by the detection service 216. The issue record may include an identifier of the issue, text relevant to identifying and/or describing the issue, and/or metadata relating to the issue, such as may be obtained from customer data 224 stored via data storage service 222. The issue record may also include an outcome field, which may describe or quote relevant text that indicates how the issue was addressed or resolved in the textual data. The issue record may also include one or more action items, as will be described in greater detail below. An action item record may similarly include an identifier or title of the action item, text relevant to identifying and/or describing the action item, and/or metadata relating to the action item. Both of these records may be tracked by the detection service 216 and/or the contact service 210, to facilitate efficient and effective resolution and tracking of issues and related action items.

In some examples, upon an action item being created, the action item itself or a notification or representation thereof may be provided to the control interface 212 of the contact service 210. In some cases, the action item or notification thereof may be provided in real time or near-real time as the contact service is receiving or processing the audio stream 228. This may be to enable an operator, such as an agent of the contact service 210 to see and/or edit the action item while the audio stream is taking place or shortly thereafter, to improve efficiency in handling communications with customers and the like.

Figure 3:
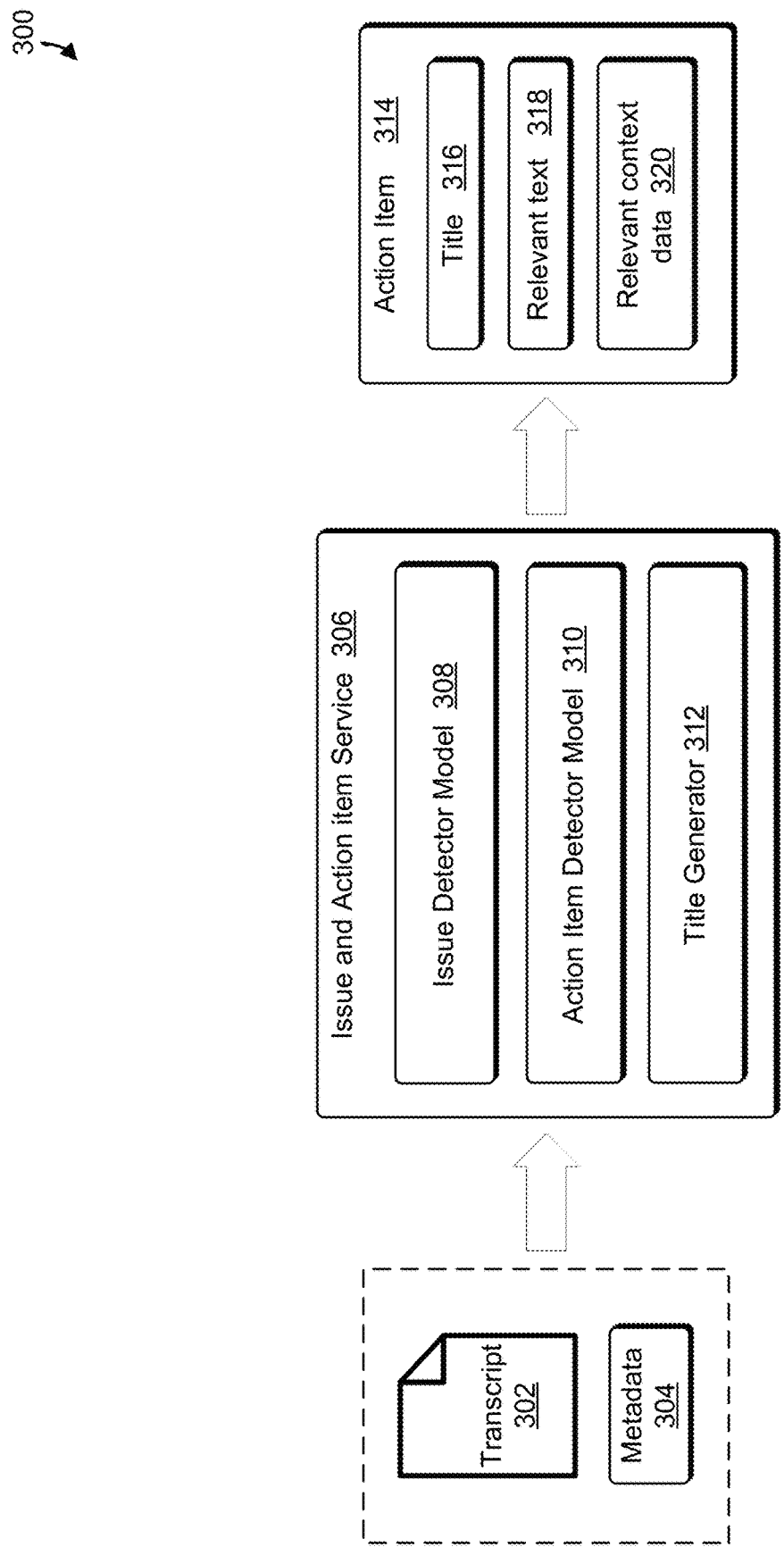
FIG. 3 illustrates an example of an issue and action item detection service, according to at least one embodiment.

FIG. 3 illustrates another example of an issue and action item detection service 316, which may include one or more aspects of detection service 216 described above in reference to FIG. 2. As illustrated, the issue and action detection service 306, or detection service, may include one or more issue detector models 308, one or more action item detector models 310, and a title generator 312. In some cases, issue detector model 308 may be an example or component of the issue detector 218 described above in reference to FIG. 2. Similarly, the action item detector model 310 may be an example or component of the action item detector 218 described above in reference to FIG. 2.

In some cases, the issue detector model 308 and the action item detector model 310 may include one or more machine learning models that have been trained on data, such as one or more transcripts, or other textual data that was generated from interactions between a contact service and a customer device, as described above in reference to FIG. 2. The issue detector model 308 and/or the action item detector model 310 may each include one or more trained BERT models, which will be described below in reference to FIG. 5. From a high level, each of detector models 308 and 310 may be trained on data and particular examples or instances of issues and action items may be identified or tagged and labeled, such that the models 308 and 310 may be trained to detect similar instances of issues and action items within data, particularly textual data as described herein.

In some aspects, detection service 306 may include a title generator 312. The title generator may include one or a collection of computing resources, such as one or more machine learning models and/or functions that execute to generate a title of an action item from textual data. In some cases, generating a title may include simply extracting words or phrases from the textual data, retaining the order of that data or phrase, and outputting a title to be used for efficient identification of the an action item and a corresponding action to be taken to resolve or satisfy the action item. In other cases, the title may be generated or derived from the textual data, such that new data is created in the process of generating the title. In some cases, metadata, such as metadata 304 or contextual data may be extracted from the textual data or one or more client data records relating to the textual data to generate the title.

As illustrated, the detection service 306 may obtain or receive a transcript 302 or other textual data, and in some cases, metadata 304 relating to the transcript 302. As described above, in some cases, the transcript 302 may be generated from an audio stream or audio data representing interactions between two or more users or entities. In some cases, metadata 304 may include data relating to the audio stream or transcript itself, such as data/time information, speaker information, or other information which may be included in the transcript 302 itself or derived from the transcript 302. In other examples, transcript 302 may represent or be a collection of textual messages exchanged between users, such as an agent and a customer, via a text messaging or chat application. In this example, speaker or source information may be included in the transcript from the application in which the messaging took place.

In yet some aspects, the metadata may include data obtained from one or more records or accounts, such that may be identified from data contained within the transcript 302. In one example, an invoice number or customer identifier or name may be extracted from the transcript and customer data, may be obtained from one or more data stores and provided to the detection service 306. In other cases, the detection service may request and obtain metadata 304 from one or more data sores, such as from one or more customer records 226 described above in reference to FIG. 2. In some cases, this may be performed by default or upon detection of certain identifiers (e.g., invoice number, customer name or identifier, product identifier, service identifier, etc.) in the transcript 302 by the detection service 306.

The detection service 306 may then process the transcript 302, and in some cases the metadata 304 (if available or included with the transcript 302) through the issue detector model 308 to determine if any issues can be identified in the transcript. If an issue is detected, some or all of the transcript 302 may then be processed through the action item detector model 310 to determine if any action items can be detected or identified in the transcript 302. In some cases, textual data coming after the data that indicated an issue may be processed by the action item detector model 310 either first or exclusively, as an action item typically proceeds identification of the issue (e.g., an agent stating they will do something upon a customer identifying an issue they have with a product or service). In other cases, other portions of the transcript 302 may be selectively searched/processed by the action item detector model 310 to detect one or more action items.

Upon detection of one or more action items, the detection service 306 may generate a data structure or record 314 to represent the action item. Action item data structure 314 may take a variety of forms and include different data. In one example, an action item 314 may include a title 316, as generated by the title generator 312, relevant text to identify and describe the action item 318 that is the basis for generation of the action item 314, and any relevant context data or metadata relevant to aid in identification and/or resolution of the action item itself. In some cases, fields 316, 318, 320 of the action item data structure 314 may include alpha-numeric data or text.

Figure 4:
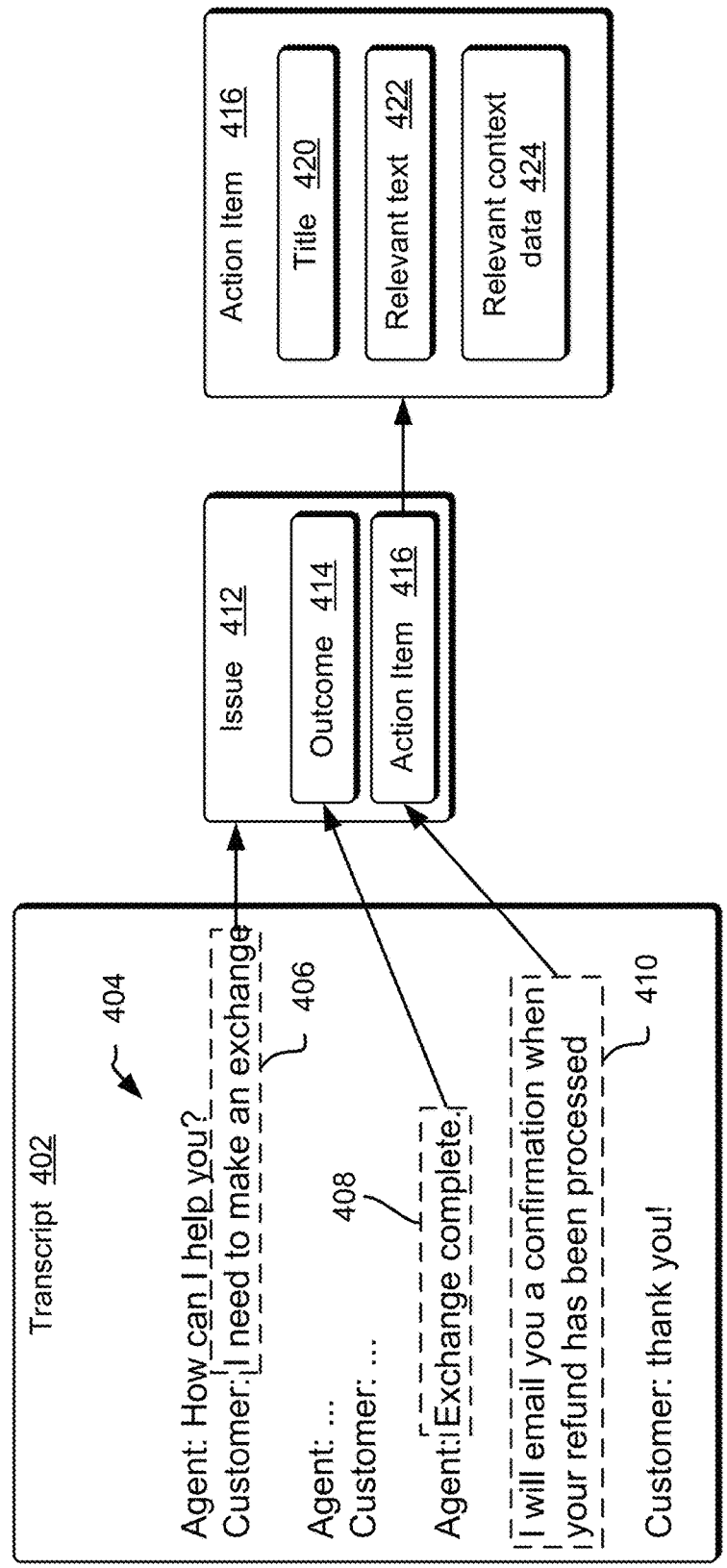
FIG. 4 illustrates an example mapping between a transcript, a detected issue, and an action item, according to at least one embodiment.

FIG. 4 illustrates an example mapping 400 between a transcript 402, a detected issue 412, and an action item 418. As illustrated, the transcript 402 and action item 418 may include one or more aspects of transcript 108, 302 and action item 116, 314 described above in reference to FIGS. 1 and 3. Similarly, the transcript 402, issue record 412, and action item 418 may refer to similarly named data structures as more generally described in reference to FIGS. 1-3. Transcript 402 is only given by way of example; it should be appreciated that other textual data, including relating to different interactions, including any number of contributors, and is contemplated herein as being compatible with the described techniques. Similarly, the transcript 402 may include messaging communicated via a text messaging or chat application, such as accessible via a variety of computing devices, including smart phones, laptops, desk top computers, etc. It should be appreciated that transcript as used herein, refers to any record of communications between two or more users, regardless of the source of the application and/or format of the actual data.

As illustrated, transcript 402 may include a collection of textual data 404 separated out into different contributors or sources of the text. In the example illustrated, two sources of text, an agent and customer, may be included in the transcript. As illustrated, text that incudes "I need to make an exchange" 406 as stated by the customer may be identified by an issue detector as corresponding to an issue that triggers he creation of an issue record or data structure 412. Later in the interaction, as represented in transcript 402, the agent may state "exchange complete" 408. This statement 408, in context of the issue statement 406, may be identified as an outcome of the issue, and be extracted and added to the issue record 412 in an outcome field 414. In some aspects, the outcome field 414 may represent a state of the issue as determined in the transcript itself.

Later in the transcript, the agent may state "I will email you a confirmation when your refund has been processed" 410. In some cases, an action item detector may identify this statement as satisfying criteria for an action item to be created. In this case, a representation of the action item 416 may be added to issue record 412. The action item field or data structure 416 may include text from the transcript 402 that satisfied criteria for an action item detection, and/or may include other data as well. In cases where an action item is positively identified for an issue, such as in the example illustrated, an action item record or data structure 416 may then be generated. However, not all issues may have a corresponding action item (e.g., in the cases where the issue if fully resolved in the textual data and no further action is promises or identified). The action item data structure 416 may include one or more field, such as a title 420, relevant text 422, and/or relevant context data or metadata 424, as similarly described above in reference to FIG. 3.

Figure 5:
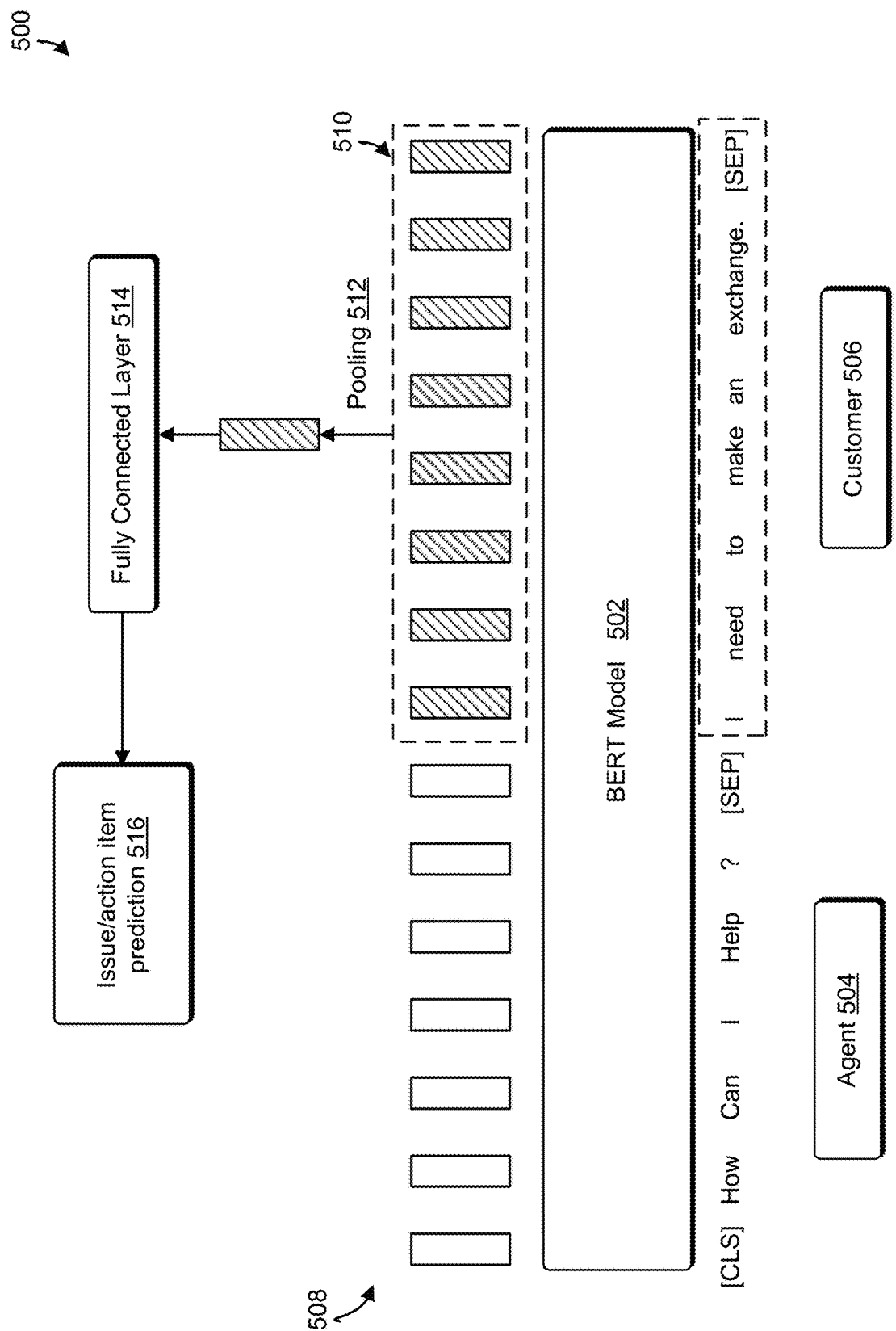
FIG. 5 illustrates an example machine learning model that may be used to detect issues and action items from textual data, according to at least one embodiment.

FIG. 5 illustrates an example machine learning model 500 that may be used to detect issues and action items from textual data. In the example illustrated, a BERT model 502 is shown processing an interaction, such as may be found in a transcript or other representation of an interaction between two users or entities. It should be appreciated that model 502 and process 500 are only given by way of example, the use of different machine learning models, NLP models, and various other models may be used to similar effect to detect issues and action items in data. In the example illustrated, a first statement made by an agent (e.g., a user or an automated agent 504), "How can I Help?" may be represented by different syllable blocks 508. A responsive statement made by a customer 506: "I need to make an exchange" may be represented by another collection of syllable blocks 510.

In the example illustrated, the customer statement 510 may be separated from the agent statement 508, grouped together, and pooled at operation 512. As illustrated, grouping and pooling, at operations 510 and 512 portions of the text may be used to isolate and extract certain features, such as may correspond to an issue or an action item. In some cases, a sequence classier may be implemented to narrow down the smallest number of consecutive words that identify an issue or action item (or an outcome in some examples). Next, the output of operations 510, 512 may be run through a fully connected layer (FCL) 514, which may be used to classify the extracted features. The result of the FCL processing may include a prediction of whether an issue or action item has been detected in the textual data.

In the example where model 502 is used to identify an issue, the output of the FCL 514 may be a binary output, such that it's whether or not an issue is present in the extracted textual data. In some aspects, the output of the model 502 when used to identify one or more action items may similarly be binary, such as indicating whether or not an action item is present in the textual data processed.

In some cases, training of model 502, in either the issue detection context or the action item context, may be fully or partially supervised, such that issues and action items are identified and labeled in the training data. It should be appreciated that given the differences between identifying an issue and identifying an action item, that similarly structured models, such as model 502 using process 500 described above may be trained on different data, such that two or more models are used in production: one or more models trained on issue related data and one or more models trained on action item related data.

Figure 6:
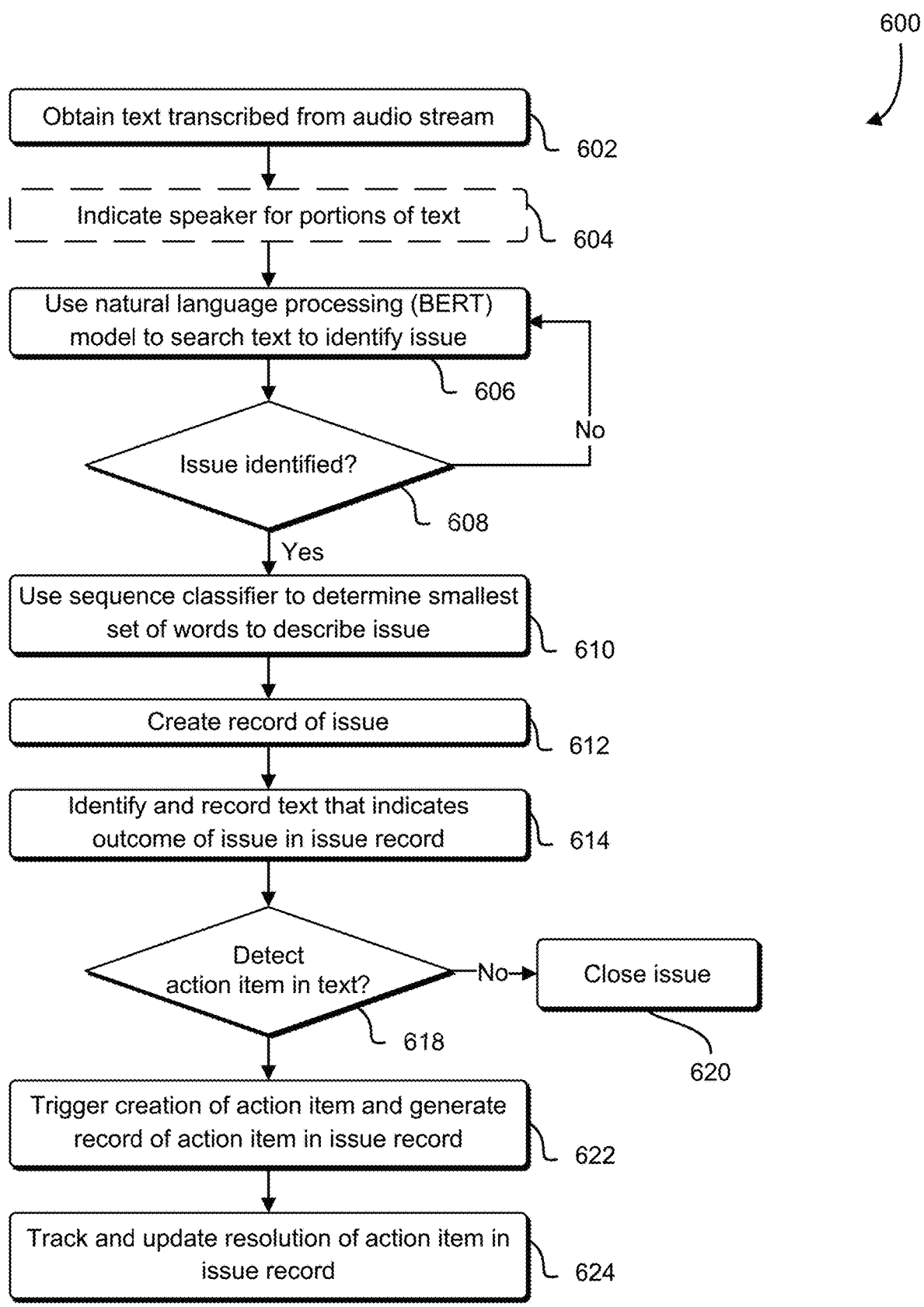
FIG. 6 illustrates an example process for detecting issues and corresponding action items from transcribed audio data, according to at least one embodiment.

FIG. 6 illustrates an example process 600 for detecting issues and corresponding action items from transcribed audio data. In some aspects, various operations of process 600 may be performed by one or more of a contact service 210, a transcription service 214, and/or a detection service 216, 306 as described above in reference to FIGS. 2 and 3.

Process 600 may begin at operation 602, in which textual data, such as a transcript 108, 302, 402 from an audio stream or recording 104, 228, may be obtained or received. In some optional aspects of process 600, speaker or source data may be added or inserted into the transcript data, at operation 604. In some cases, operation 604 may be performed by a transcription service, such as service 214. Next, the transcript may be searched or processed, such as via the techniques described above using one or more NLP or BERT models, to determine if any issues are present in the transcript, at operation 606. If no issues are identified at operation 608, process 600 may loop through operation 606 and 608 until the entire textual document has been processed, or until an issue is identified, at operation 608. If an issue is identified, then process 600 may proceed to operation 610, in which a sequence classifier may be used to determine the smallest set of words that describe or correspond to the issue. A record of the detected issue may then be created, at operation 612, using the set of words that identify or describe the issue.

In some cases, operation 606 may further include separating the textual data/transcript into a number of windows or segments to facilitate analyzing the text. In some cases, the transcript may be segmented according to various features of the transcript itself, such as pauses, sentence structure, punctuation, change in identified speaker, and so on. Each segment may then be analyzed and run through one or more NLP or BERT models to determine if any issues are present in the transcript.

Once an issue has been identified, the transcript may be processed and one or more outcomes of the issue may be identified in the transcript, at operation 614. Once an outcome has bene identified, it may be recorded or associated with the issue. It may then be determined it any action items relating to the issue are detected in the transcript, at operation 618. If no issues are detected, the issue may be closed at operation 620. In some cases, closing an issue may include associating some type of indication that no further action has bene identified to resolve the issue with the issue. If an action is detected or identified, at operation 618, an action item data record creation event may be triggered and a record of the action item generated, at operation 622. Operation 622 may include generating an action item including one or more aspects of an action item described above in reference to FIGS. 3 and 4. In some cases, process 600 may further include operation 624, in which resolution of the action item may be tracked and updated in the issue record, at which point, upon resolution, the issue may be closed. In some aspects, an issue may be closed, or an indication that the issue didn't necessitate further action associated with the issue, upon opening an action item relating to that issue. In these scenarios, the action item record may indicate that further action needs to be taken, thus rendering the issue record itself duplicative. In these cases, it may be beneficial to indicate that issue as resolved and close the issue.

In some cases, more than one action item may be detected for a given issue. In this scenario, all of the action items may be grouped together in a single action item data structure. In other cases, multiple action items may be created for a single issue. In either case, upon creating an action item record at operation 622, process 600 may loop back to operation 618 until no more unsearched or unanalyzed text is present in the transcript. In some aspects, if multiple issues are identified at operation 608, outcomes and action items may be identified and associated with different issues contemporaneously or serially, such that operations of process 600 may be run in parallel for different identified issues. In other implementations, the transcript may be analyzed from beginning to end, with different outcomes and actions items be associated with a corresponding issue.

Figure 7:
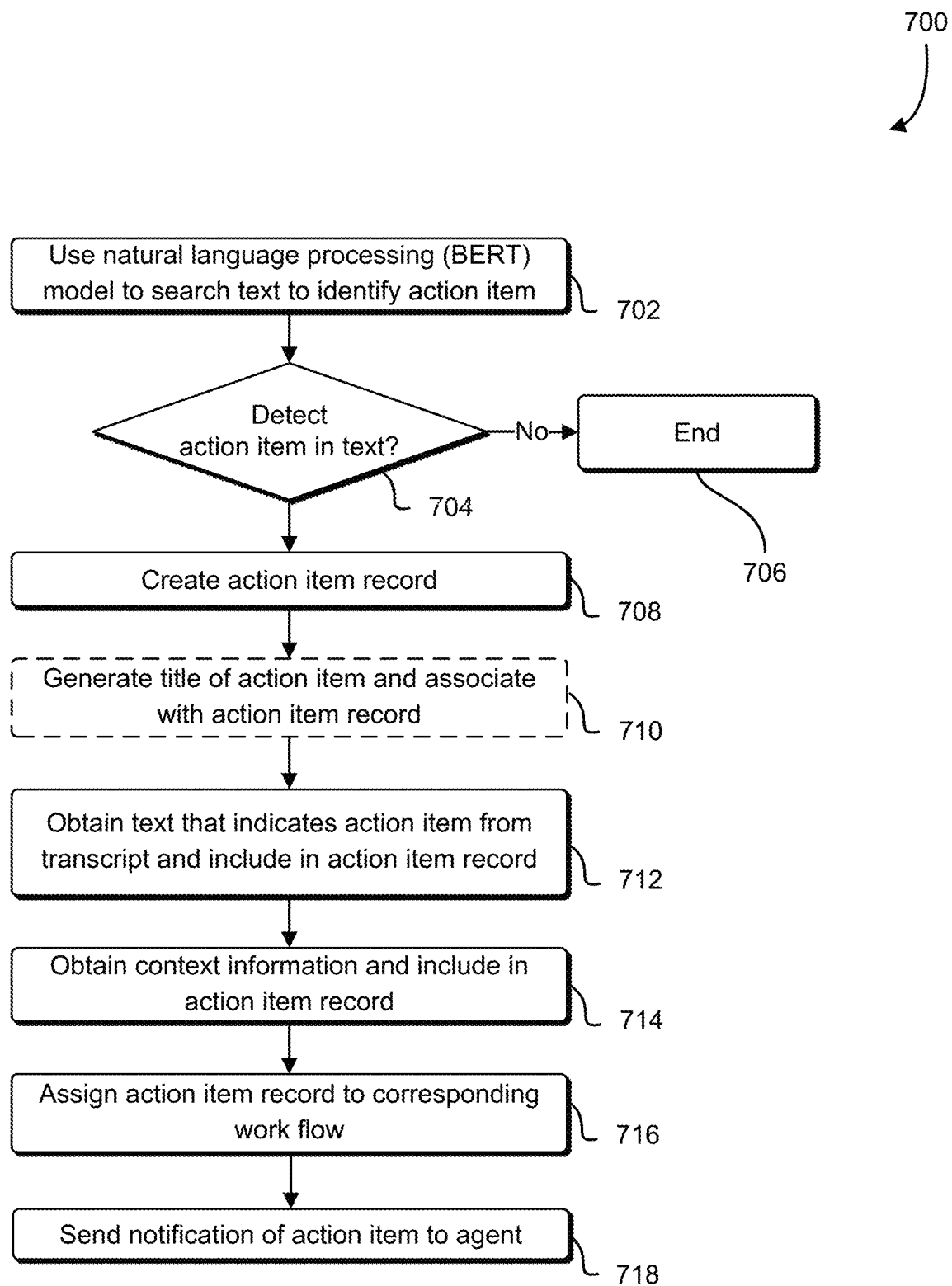
FIG. 7 illustrates an example process for detecting and generating an action item from textual data, according to at least one embodiment.

FIG. 7 illustrates an example process 700 for detecting and generating an action item from textual data. In some aspects, various operations of process 700 may be performed by one or more of a contact service 210, a transcription service 214, and/or a detection service 216, 306 as described above in reference to FIGS. 2 and 3. In one example, process 700 may be a more detailed example of operations 618 and 622 of process 600 described above in reference to FIG. 6.

Process 700 may begin at operation 702, in which one or more NLP or BERT models may be sued to search and analyze text in textual data, such as a transcript, to identify one or more action items. If no action items are detected at operation 704, process 700 may end at operation 706. However, if an action item is detected, at operation 704, then an item action record may be created, at operation 708. The action item record may include one or more aspects of action item 116, 314, 416 described above in reference to FIGS. 1, 3, and 4. Optionally, at operation 710, a title for the action item may be generated or derived, such as based on the textual data and/or context data or metadata associated with the action item.

Next, at operation 712, text that describes or indicates the action item may be obtained, copied, or extracted from the textual data and included in the action item record. In some cases, the length of the text included may be based on number of factors, such as completeness of the action item record, size of the action item record (e.g., some text may be excluded to reduce size of the action item record), and so on. At operation 714, optionally, context information relating to the action item may be obtained and included in the action item record.

At operation 716, the action item may be assigned to a corresponding contact flow or queue, such as contact flow 230 or queue(s) 232, described above, to help facilitate resolution of the action item. In some cases, the contact flow may be selected based on a number of factors such as what the action item or related issue pertains to, a type of action that is determined to relieve the action item, and/or based on other attributes of the action item itself. Similarly, the action item may be assigned to a queue, based on the action that is identified in the action item, such that the action item may be more effectively resolved. For example, if an action item indicates that a follow-up email should be sent when a refund has been processed, a corresponding refund email queue may be selected for the action time to be placed in. In other cases, queues may be configured based on a number of factors, and may be very specific or very general, depending on the needs and traffic for a given contact service.

In some cases, the action item record, or a notification thereof, may be provided to a control interface of the contact service (e.g., control interface 212 of contact service 210 described above in reference to FIG. 2), such as may be accessible to an agent during an interaction from which the transcript origins, at operation 718.

Figure 8:
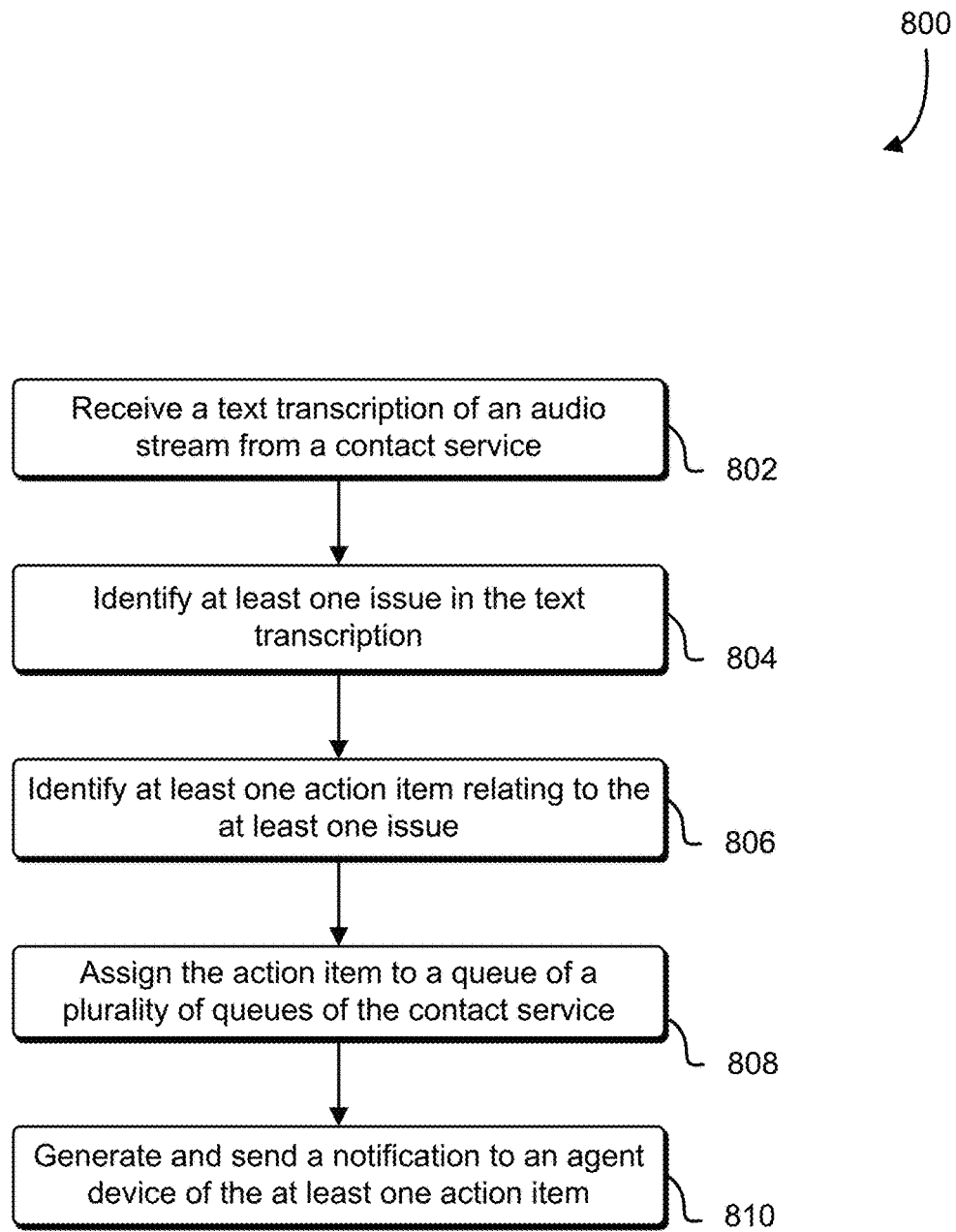
FIG. 8 illustrates an example process for detecting and sending a notification of an action time from textual data, according to at least one embodiment.

FIG. 8 illustrates an example process 800 for detecting and sending a notification of an action time from textual data. In some aspects, various operations of process 800 may be performed by one or more of a contact service 210, a transcription service 214, and/or a detection service 216, 306 as described above in reference to FIGS. 2 and 3.

Process 800 may begin at operation 802, in which a text transcription or transcript of an audio stream from a contact center may be received, such as audio stream 104, 228 as described above in reference to FIGS. 1 and 2. Next, using the techniques described above, at least one issue may be identified in the textual data of the transcription, at operation 804. Operation 804 may include using one or more models trained on issue related data. At least one action item, relating to the issue identified at operation 804, may be identified at operation 806. Operation 806 may include one or more operations of process 700 described above in reference to FIG. 7. In some cases, the action item may be assigned to a queue of a plurality of queues provided by a contact service, such as a queue 232 of contact service 210. A notification of the action item may be generated and sent to an agent computing device, such as through a control interface 212 of a contact service 210.

In some cases, upon training one or more models for issue detection and action item detection, the actual models used during production may be modified to increase efficiency of identifying issue sand action items in textual data. In some cases, reducing the size and/or complexity of the models used for detection may enable identification of issues/action items in real-time or near-real time. In some cases, reducing the size or complexity of the models may include removing data corresponding to some less common example action items, and via other techniques as will be understood by those of ordinary skill in the art. This may provide the advantage of being able to provide a notification of the action item during a communication session between two entities, such as an agent and customer, while the communication session is still active or shortly thereafter. This may enable the agent to modify or accept the action time while the contextual information is still relevant, thus increasing accuracy of action item creating and tracking, and freeing up time typically spend manually entering notes concerning action items or follow-up items.

Figure 9:
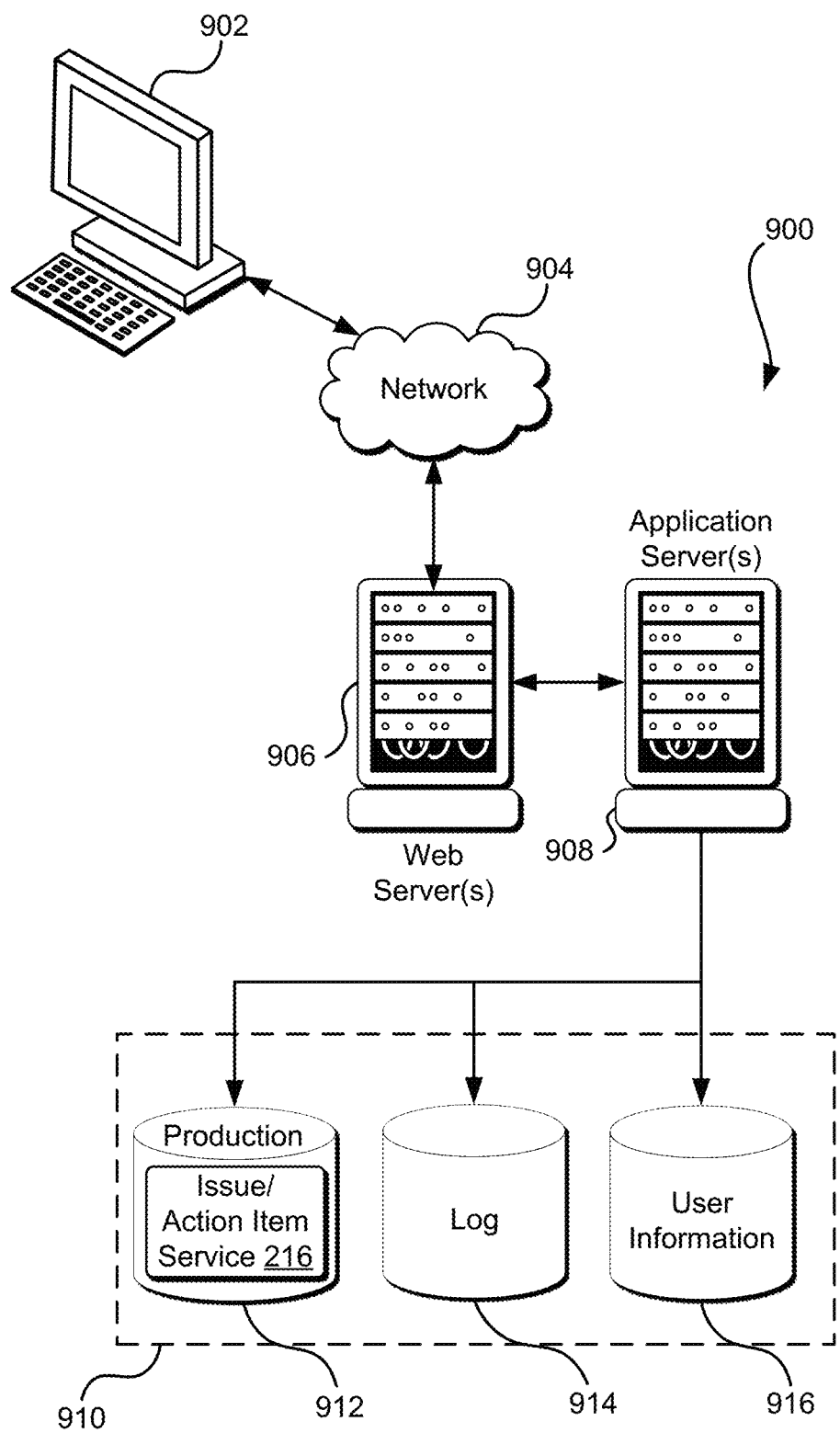
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. In some aspects, the production data 912 may include or provide the issue and action item detection service 216, as described above in reference to FIG. 2. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a text transcription of an audio stream from a computer-implemented contact center service, the audio stream comprising two channels corresponding to an interaction between a contact center agent and a customer;
   identifying an issue that calls for a resolution within a customer request in the text transcription based on determining a portion of text of the text transcription pertaining to the issue using a first trained machine learning model;
   identifying an action item relating to the issue using a second trained machine learning model, the action item comprising an action to be taken to resolve the issue;
   assigning the action item to a contact flow of a plurality of contact flows of the computer-implemented contact center service based on attributes of the action item, the contact flow corresponding to an action that is specified in the action item;
   generating a notification for the contact center agent of the action item, the notification comprising the portion of text of the text transcription pertaining to the issue and an indicator of the assigned contact flow; and
   causing the notification to be provided to the contact center agent.

2. The computer-implemented method of claim 1, further comprising:
   wherein generating the notification to the agent is performed concurrently with receiving the audio stream by the computer-implemented service.

3. The computer-implemented method of claim 1, further comprising:
   generating a title for the action item using a third machine learning model based on a portion of the text transcription; and
   generating the notification to comprise the title.

4. The computer-implemented method of claim 1, further comprising:
   identifying context information for the action item from the text transcription or an account associated with a second user based on an identification of a key word in the text transcription; and
   generating the notification to comprise the context information.

5. A system, comprising:
   one or more processors;
   memory that stores computer-executable instructions that, as a result of being executed by the one or more processors, implement a contact center service to:
      receive textual data generated based on an interaction between a contact center agent and a customer;

identify an issue within a request in the textual data based on determining a subset of words in the textual data that describe the issue using a first machine learning model;

identify an action item relating to the issue, the action item comprising an action to be performed to resolve the issue;

assign the action item to a queue of a plurality of queues based on attributes of the action item, the queue corresponding to the action that is specified in the action item; and generate and provide a notification to the contact center agent of the action item, the notification comprising the subset of words in the textual data describing the issue and an indicator of the assigned queue.

6. The system of claim 5, wherein generating the notification is performed in real-time or near-real-time as the interaction between the contact center agent and the customer.

7. The system of claim 5, wherein the computer-executable instructions further comprises instructions that, as a result of being executed by the one or more processors, further cause the system to:

generate and associate a title with the action item using a second machine learning model based on at least one of a portion of the text transcription or contextual data relating to the textual data.

8. The system of claim 5, wherein the computer-executable instructions further comprises instructions that, as a result of being executed by the one or more processors, further cause the system to:

identify context information for the action item from at least one of the textual data or an account associated with the textual data based on an identification of at least one identifier in the textual data; and associate the context information with the action item.

9. The system of claim 5, wherein the computer-executable instructions further comprises instructions that, as a result of being executed by the one or more processors, further cause the system to:

generate the action item to include a subset of the textual data that identifies an action to be performed.

10. The system of claim 5, wherein the first machine learning model comprises a Bidirectional Encoder Representation from Transformers model.

11. The system of claim 5, wherein the computer-executable instructions further comprises instructions that, as a result of being executed by the one or more processors, further cause the system to:

identify data indicating an outcome associated with the issue from the textual data; and associate the data indicating the outcome with a record of the issue.

12. A non-transitory computer-readable storage medium storing thereon executable instructions that, as a result of being executed by one or more processors of a computer system, cause the computer system to at least:

receive textual data generated based on an interaction between a contact center agent and a customer;

identify an issue relating to a request in the textual data based on determining a minimal set of words in the textual data that describe the issue using a first machine learning model;

identify an action item relating to the issue, the action item comprising an action to be performed to resolve the issue;

assign the action item to a queue of a plurality of queues based on attributes of the action item, the queue corresponding to the action that is specified in the action item; and generate a notification of the action item, the notification comprising a portion of text pertaining to the action item and an indicator of the assigned queue.

13. The non-transitory computer-readable storage medium of claim 12, wherein the instructions further comprise instructions that, as a result of being executed by the one or more processors, cause the computer system to:

associate an indicator of the assigned queue with the notification.

14. The non-transitory computer-readable storage medium of claim 12, wherein the instructions further comprise instructions that, as a result of being executed by the one or more processors, cause the computer system to:

identify the issue in the textual data generated based on the interaction between the contact center agent and the customer.

15. The non-transitory computer-readable storage medium of claim 14, wherein the information generated based on the interaction between the contact center agent and the customer comprises textual data transcribed from audio data, wherein the interaction between the contact center agent and the customer comprises the audio data.

16. The non-transitory computer-readable storage medium of claim 12, wherein the instructions further comprise instructions that, as a result of being executed by the one or more processors, cause the computer system to:

provide the notification in a graphical user interface accessible to the contact center agent, wherein the notification further comprises selectable options to approve the action item, delete the action item, or modify the action item.

17. The non-transitory computer-readable storage medium of claim 16, wherein the instructions further comprise instructions that, as a result of being executed by the one or more processors, cause the computer system to:

provide the notification concurrently with the occurrence of the interaction between the contact center agent and the customer.

18. The non-transitory computer-readable storage medium of claim 12, wherein the instructions further comprise instructions that, as a result of being executed by the one or more processors, cause the computer system to:

identify a contextual information identifier related to the action item based on the textual data generated based on the interaction between the contact center agent and the customer obtain the contextual information using the contextual information identifier; and associate the contextual information with the action item.

19. The non-transitory computer-readable storage medium of claim 12, wherein the machine learning model comprises a trained natural language processing model.

* * * * *